(12) United States Patent  
Mori

(10) Patent No.: US 9,108,682 B2  
(45) Date of Patent: Aug. 18, 2015

(54) VEHICLE UNDERBODY STRUCTURE

(75) Inventor: Takeo Mori, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/371,051

(22) PCT Filed: Jan. 18, 2012

(86) PCT No.: PCT/JP2012/050990  
§ 371 (c)(1),  
(2), (4) Date: Jul. 8, 2014

(87) PCT Pub. No.: WO2013/108383  
PCT Pub. Date: Jul. 25, 2013

(65) Prior Publication Data  
US 2014/0327268 A1 Nov. 6, 2014

(51) Int. Cl.  
B62D 21/00 (2006.01)  
B62D 21/15 (2006.01)  
B62D 25/20 (2006.01)

(52) U.S. Cl.  
CPC .............. B62D 21/157 (2013.01); B62D 25/20 (2013.01)

(58) Field of Classification Search  
CPC .............................. B62D 21/157; B62D 25/20  
USPC ................... 296/187.08, 193.07, 204  
See application file for complete search history.

(56) References Cited

U.S. PATENT DOCUMENTS

| 8,167,360 B2 * | 5/2012 | Deng et al. ............... 296/187.08 |
| 2009/0146457 A1 | 6/2009 | Kanagai et al. |
| 2011/0210582 A1 | 9/2011 | Mori |

FOREIGN PATENT DOCUMENTS

| JP | 10 203426 | 8/1998 |
| JP | 2000 168627 | 6/2000 |
| JP | 2007 314131 | 12/2007 |
| JP | 2008 68720 | 3/2008 |
| JP | 2010 120404 | 6/2010 |

OTHER PUBLICATIONS

International Search Report Issued Apr. 24, 2012 in PCT/JP12/050990 Filed Jan. 18, 2012.

* cited by examiner

*Primary Examiner* — Joseph D Pape  
(74) *Attorney, Agent, or Firm* — Oblon, McClelland, Maier & Neustadt, L.L.P.

(57) ABSTRACT

A vehicle underbody structure includes a floor panel that is provided to extend in a longitudinal direction of a vehicle body; a pair of rockers that are respectively provided along both side portions of the floor panel in the vehicle body to extend in the longitudinal direction of the vehicle body; and a cross member that is mounted in a bridging manner between the pair of rockers to be apart from a floor surface of the floor panel, and that has strength greater than that of the rocker.

6 Claims, 13 Drawing Sheets

VEHICLE UNDERBODY STRUCTURE

TECHNICAL FIELD

The present invention relates to a vehicle underbody structure.

BACKGROUND ART

In the related art, for example, Japanese Unexamined Patent Application Publication No. 2000-168627 discloses a vehicle underbody structure that efficiently absorbs energy in a side collision. The vehicle underbody structure has a Z-shaped portion in a cross member, which is positioned in the vicinity of a tunnel portion of a floor panel, and thus the vehicle underbody structure suppresses an occurrence of a moment in a center pillar in a side collision, and absorbs energy.

When a collision load is exerted on the center pillar and the like, a rotational moment about a longitudinal axis is exerted on a rocker (a side sill) that is joined with a lower portion of the center pillar, and a torsional deformation occurs so that an upper portion of the rocker collapses inward in a width direction of a vehicle body. When the torsional deformation is increased, a rotational deformation, by which the center pillar collapses inward in the width direction of the vehicle body, is increased, and thus a collision performance of the vehicle underbody structure in a side collision cannot be satisfactorily ensured.

CITATION LIST

Patent Literature

[Patent Literature 1] Japanese Unexamined Patent Application Publication No. 2000-168627

SUMMARY OF INVENTION

Technical Problem

For this reason, in the vehicle underbody structure of the related art, a reinforcement member such as a cross member is provided in the vicinity of the lower portion of the center pillar so as to suppress the torsional deformation of the rocker. However, the side collision performance cannot be always satisfactorily ensured.

The present invention provides a vehicle underbody structure that can improve a side collision performance.

Solution to Problem

A vehicle underbody structure according to an aspect of the present invention includes a floor panel that is provided so as to extend in a longitudinal direction of a vehicle body; a pair of rockers that are respectively provided along both side portions of the floor panel in the vehicle body so as to extend in the longitudinal direction of the vehicle body; and a cross member that is mounted in a bridging manner between the pair of rockers so as to be apart from a floor surface of the floor panel, and that has strength greater than that of the rocker.

In the vehicle underbody structure according to the aspect of the present invention, the pair of rockers are respectively provided along both side portions of the floor panel in the vehicle body so as to extend in the longitudinal direction of the vehicle body, and the cross member is mounted in a bridging manner between the pair of rockers so as to be apart from the floor surface of the floor panel, and has strength greater than that of the rocker. Accordingly, when a side collision occurs, an upper portion of the rocker is more rigidly supported than a lower portion of the rocker by an axial force of the cross member that has strength greater than that of the rocker, and thus the lower portion of the rocker is likely to be pushed toward a region under the cross member. Therefore, a torsional deformation of the rocker is suppressed in order for the upper portion thereof not to collapse inward in a width direction of the vehicle body, a rotational deformation of a center pillar is also suppressed, and thus it is possible to improve a collision performance of the vehicle underbody structure in the side collision.

A protrusion portion may be provided in an inner lower portion of the rocker so as to protrude inward in the width direction of the vehicle body. Accordingly, when a side collision occurs, the protrusion portion hits against the cross member, and thus the lower portion of the rocker is more likely to be pushed toward the region under the cross member.

The cross member may have a first cross portion that is provided on a front side of the vehicle body so as to extend in the width direction of the vehicle body; a second cross portion that is provided on a rear side of the vehicle body so as to extend in the width direction of the vehicle body; and a pair of connection members that connect the first and second cross portions along the pair of rockers, respectively. Accordingly, when a side collision occurs, energy can be absorbed by deformation of the connection members. It is possible to reduce the number of reinforcement components that reinforce the vicinity of a lower portion of the center pillar.

The floor panel may be provided with a bulging portion that bulges upward from the floor surface so as to be in contact with a lower surface of the first cross portion. Accordingly, a load is transmitted from the first cross portion to the bulging portion, and thus the rigidity of the vehicle underbody structure can be improved.

A tunnel portion may be provided at a center portion of the floor panel, and the cross member may be provided with a fragile portion that is bent so as to cover the tunnel portion. Accordingly, when a side collision occurs, the fragile portion deforms in such a manner that a cross section of the deformed fragile portion becomes a substantially Z shape, the rocker is likely to deform in such a manner that the rocker moves substantially in parallel with the width direction of the vehicle body, and a torsional deformation of the rocker can be suppressed.

The cross member may be formed so as to have a cross-sectional height smaller than that of the rocker. Accordingly, the cross-sectional height of the cross member is suppressed so as not to be large, and thus it is possible to adopt the cross member with a structure suitable for application of an ultrahigh tensile strength steel sheet.

Advantageous Effects of Invention

According to the aspect of the present invention, it is possible to provide the vehicle underbody structure that can improve the side collision performance.

DESCRIPTION OF EMBODIMENTS

Hereinafter, an embodiment of the present invention will be described in detail with reference to the accompanying drawings. The same reference signs will be assigned to the same elements in the description of the drawings, and the repeated descriptions will be omitted.

First, a vehicle underbody structure according to the embodiment of the present invention will be described with reference to FIGS. 1 to 7.

Figure 1:
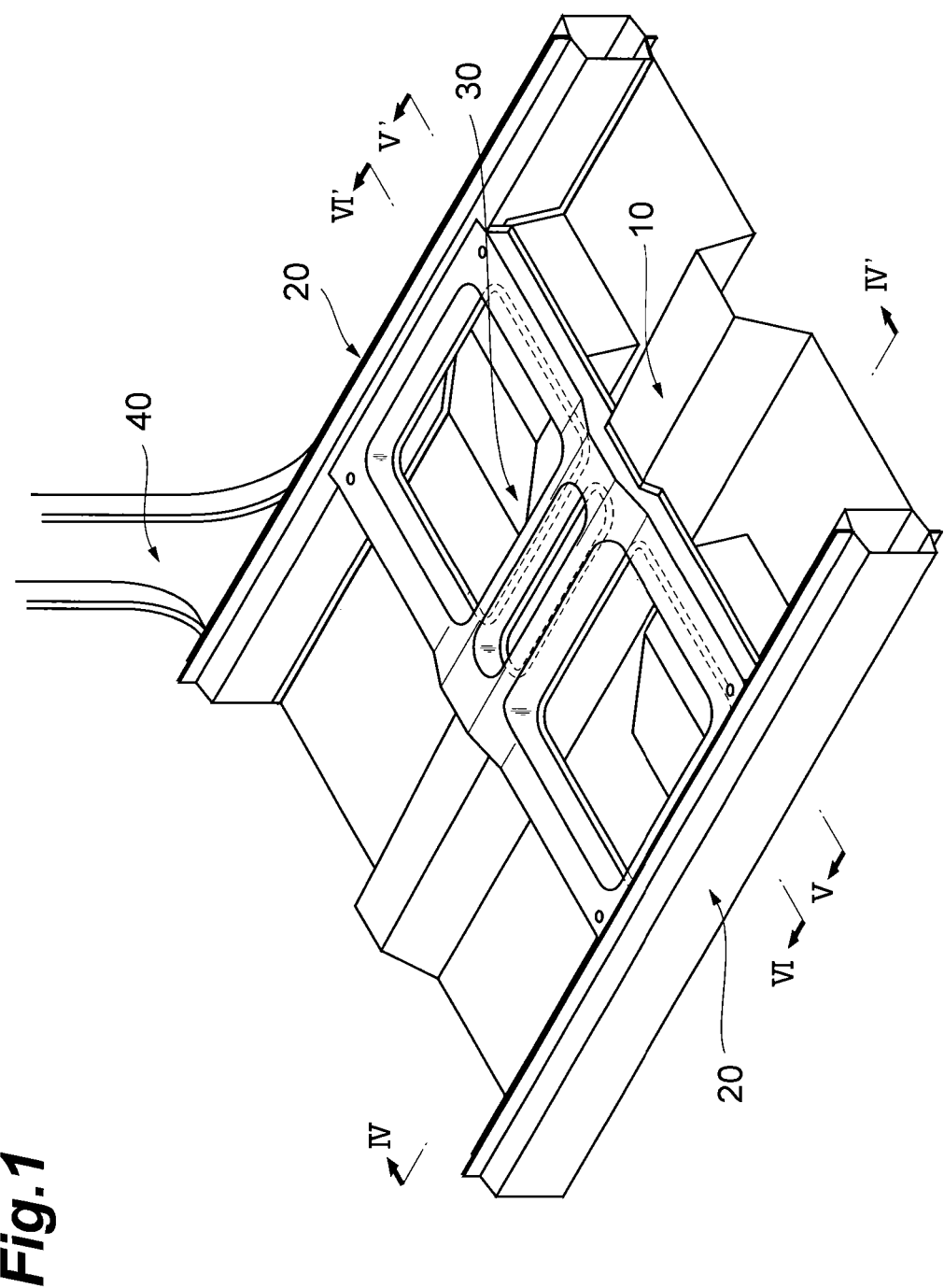
FIG. 1 is a perspective view illustrating a vehicle underbody structure according to an embodiment of the present invention.

FIG. 1 is a perspective view illustrating the vehicle underbody structure according to the embodiment of the present invention. As illustrated in FIG. 1, the vehicle underbody structure includes a floor panel 10, a pair of rockers (side sills) 20, and a cross member 30. The floor panel 10 is provided in a lower portion of a vehicle body so as to extend in a longitudinal direction (in a right and left direction in FIG. 1) of the vehicle body. The pair of rockers 20 are respectively provided along right and left sides of the floor panel 10 of the vehicle body so as to extend in the longitudinal direction of the vehicle body. The cross member 30 is mounted in a bridging manner between the pair of rockers 20 so as to be apart from a floor surface 11 (refer to FIG. 2) of the floor panel 10, and the cross member 30 has strength greater than that of the rocker 20.

Figure 2:
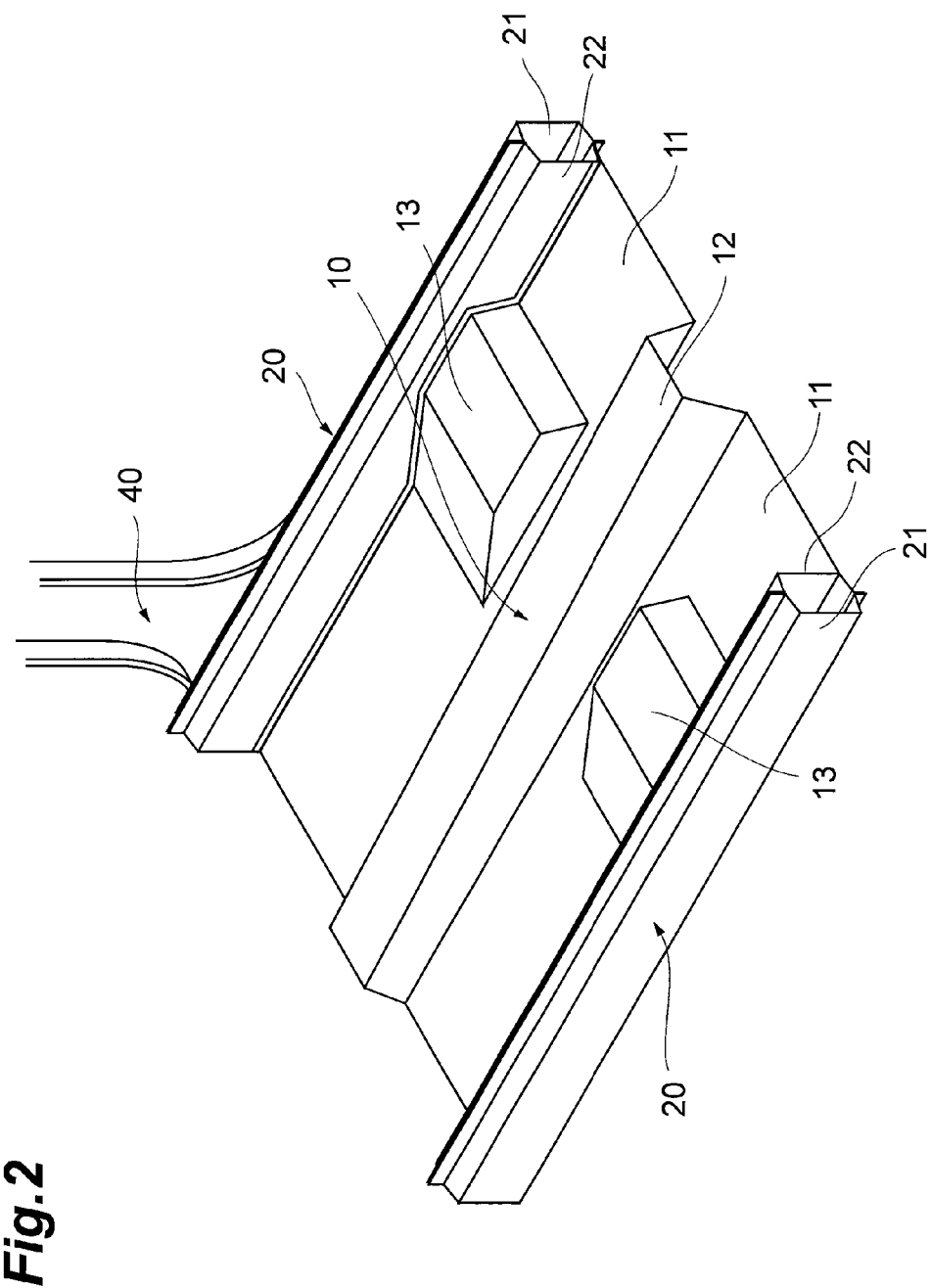
FIG. 2 is a perspective view illustrating a floor panel and a rocker of the vehicle underbody structure.

FIG. 2 is a perspective view illustrating the floor panel 10 and the rocker 20 of the vehicle underbody structure. As illustrated in FIG. 2, the floor panel 10 is provided with a tunnel portion 12 that protrudes upward from the floor surface 11 and bisects the floor panel 10 in a width direction of the vehicle body. For example, the tunnel portion 12 is formed to have a substantially inverse U-shaped cross section. Floor bulging portions (bulging portions) 13 are provided so as to respectively protrude upward from the floor surfaces 11 on both sides of the tunnel portion 12. For example, the floor bulging portion 13 is formed in a pillow shape. As illustrated in FIG. 2, the floor bulging portion 13 is in contact with a side surface of the rocker 20, and is provided so as to be apart from a side surface of the tunnel portion 12. The floor surface 11 is a flat surface that faces the cross member 30, and is a surface (an upper surface) on which the tunnel portion 12 or a floor bulging portion 13 is not formed.

As illustrated in FIG. 2, for example, the rocker 20 is a cylindrical member with a square cross section, and may be a cylindrical member with a circular cross section. A center pillar 40 provided so as to extend in a vertical direction of a vehicle is joined with a center of the rocker 20 in the longitudinal direction of the vehicle body (FIG. 2 illustrates only one center pillar 40). The rocker 20 is configured to have an outer rocker 21, an inner rocker 22, and a bulkhead (a reinforcement portion) 23. The rocker 20 will be described in detail with reference to FIG. 7.

Figure 3:
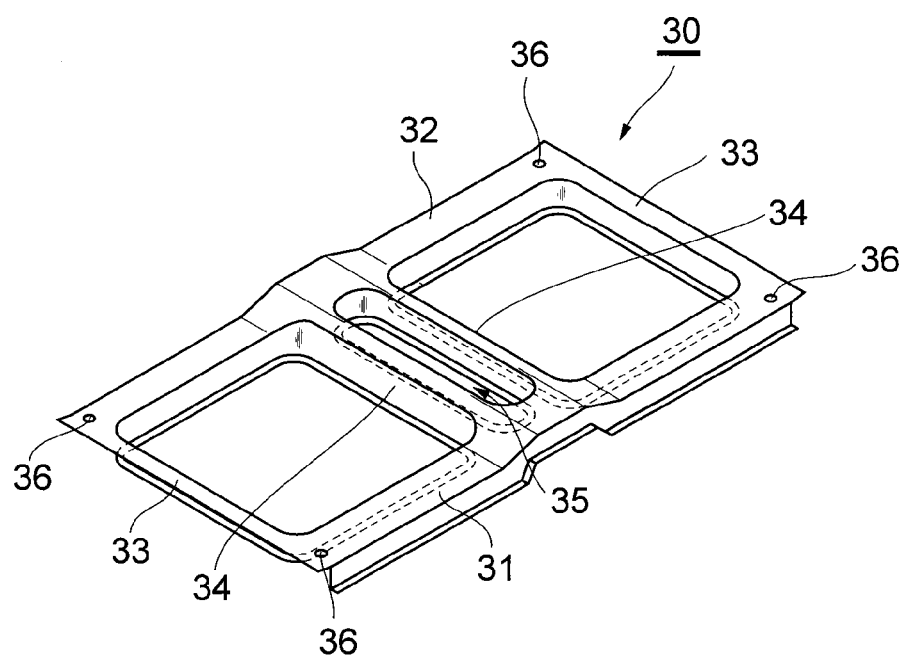
FIG. 3 is a perspective view illustrating a cross member of the vehicle underbody structure.

FIG. 3 is a perspective view illustrating the cross member 30 of the vehicle underbody structure. For example, the cross member 30 is a member that has a substantially rectangular shape in a plan view. The cross member 30 is mounted in a bridging manner so as to be apart from the floor surface 11, for example, so as to be apart at an approximately cross-sectional height of the cross member 30 from the floor surface 11 in such a manner that an upper portion of the rocker 20 is more rigidly supported than a lower portion of the rocker 20 in a side collision by an axial force of the cross member 30 that has strength greater than that of the rocker 20. The cross member 30 bridges the pair of rockers 20 in such a manner that right and left portions of the cross member 30 support the upper portions of the rockers 20. The cross member 30 is configured to have a first cross portion 31, a second cross portion 32, a pair of rocker reinforcement portions 33 as connection members, and a pair of tunnel reinforcement portions 34 as connection members. It is preferred that the members be integrally formed, but the members may be formed by assembly thereof. The cross member 30 is formed of an ultra-high tensile strength steel sheet with a tensile strength grade greater than or equal to 1500 Mpa, an aluminum diecast material or the like.

The first cross portion 31 and the second cross portion 32 are respectively provided on front and rear sides of the cross member 30 of the vehicle body so as to extend in the width direction of the vehicle body, and for example, each cross portion is formed so as to have a substantially hat-shaped cross section. The pair of rocker reinforcement portions 33 are respectively provided along the rockers 20 on right and left sides of the vehicle body, and the rocker reinforcement portions 33 connect the first cross portion 31 and the second cross portion 32. For example, the rocker reinforcement portion 33 is formed so as to have a substantially Z-shaped cross section. The pair of tunnel reinforcement portions 34 are respectively provided along right and left sides of the tunnel portion 12, and the tunnel reinforcement portions 34 bisect the cross member 30 in the width direction of the vehicle body to connect the first cross portion 31 and the second cross portion 32. For example, the tunnel reinforcement portion 34 is formed so as to have a substantially hat-shaped cross section. An opening 35 for mounting of equipment, disposal of wiring, and the like is provided between the pair of tunnel reinforcement portions 34. Holes 36 for attachment of a seat are provided at four corners of the cross member 30.

Figure 4:
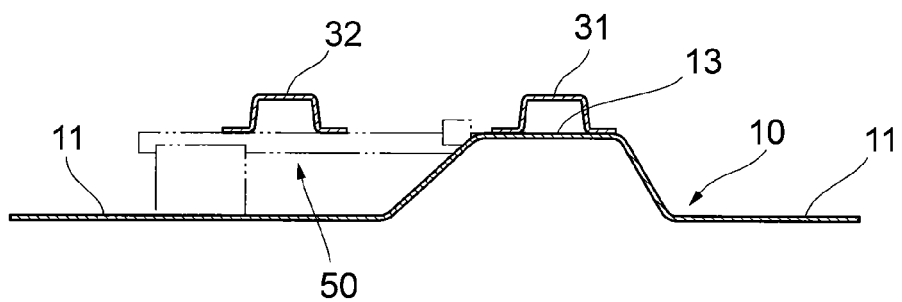
FIG. 4 is a cross-sectional view of the vehicle underbody structure taken along line IV-IV' in FIG. 1.

FIG. 4 is a cross-sectional view of the vehicle underbody structure taken along line IV-IV' in FIG. 1. As illustrated in FIG. 4, the cross member 30 is provided in such a manner that a lower surface of the first cross portion 31 is joined with an upper surface of the floor bulging portion 13, and a lower surface of the second cross portion 32 is not in contact with the floor surface 11. Therefore, the first cross portion 31 and the floor bulging portion 13 form a cross section which is closed in the longitudinal direction of the vehicle body. The second cross portion 32 is supported via another supporting member 50 by the floor surface 11 so as to ensure a footwell of a rear seat between the second cross portion 32 and the floor surface 11.

Figure 5:
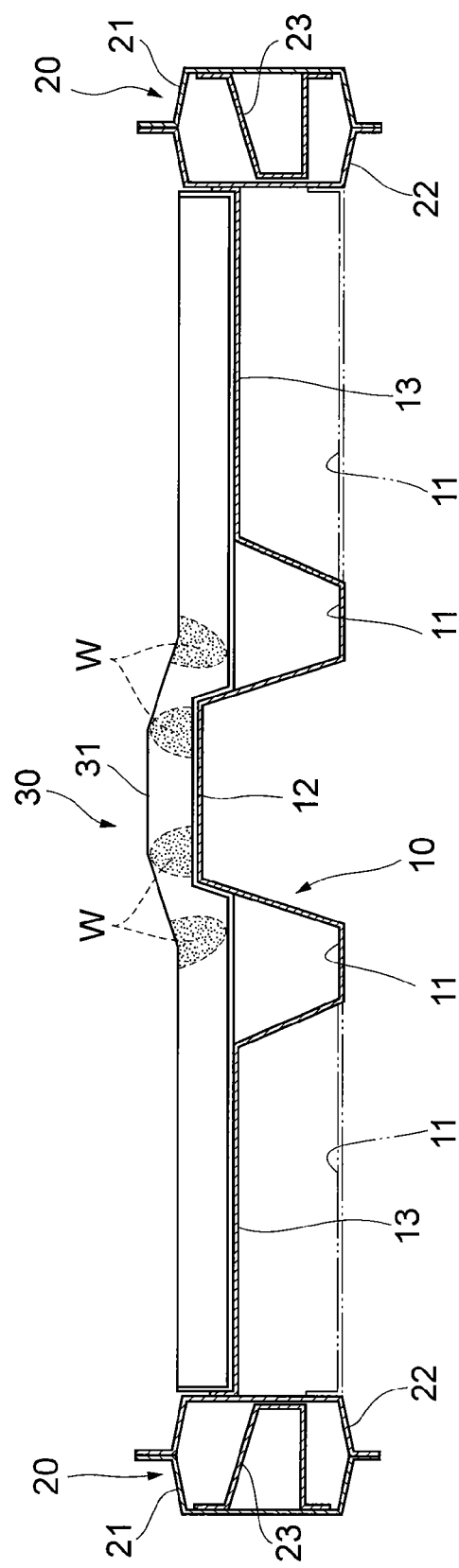
FIG. 5 is a cross-sectional view of the vehicle underbody structure taken along line V-V' in FIG. 1.

FIG. 5 is a cross-sectional view of the vehicle underbody structure taken along line V-V' in FIG. 1. As illustrated in FIG. 5, the cross member 30 is formed so as to have a cross-sectional height smaller than that of the rocker 20. The first cross portion 31 is formed in a bended shape so as to cover an upper surface of the tunnel portion 12. Fragile portions W with low material strength are provided in the bended portion. For example, the fragile portion W is provided by applying a heat treatment to the bended portion, by forming a cross-sectional notch in the bended portion, or by reducing a thickness of the member. The second cross portion 32 may be also formed similarly to the first cross portion 31. The following description of how the cross member 30 is provided is related to the description in FIG. 4. The cross member 30 is provided in such a manner that the lower surface of the first cross portion 31 is not in contact with the floor surface 11 between the floor bulging portion 13 and the tunnel portion 12 while the lower surface of the first cross portion 31 is joined with the upper surface of the floor bulging portion 13.

Figure 6:
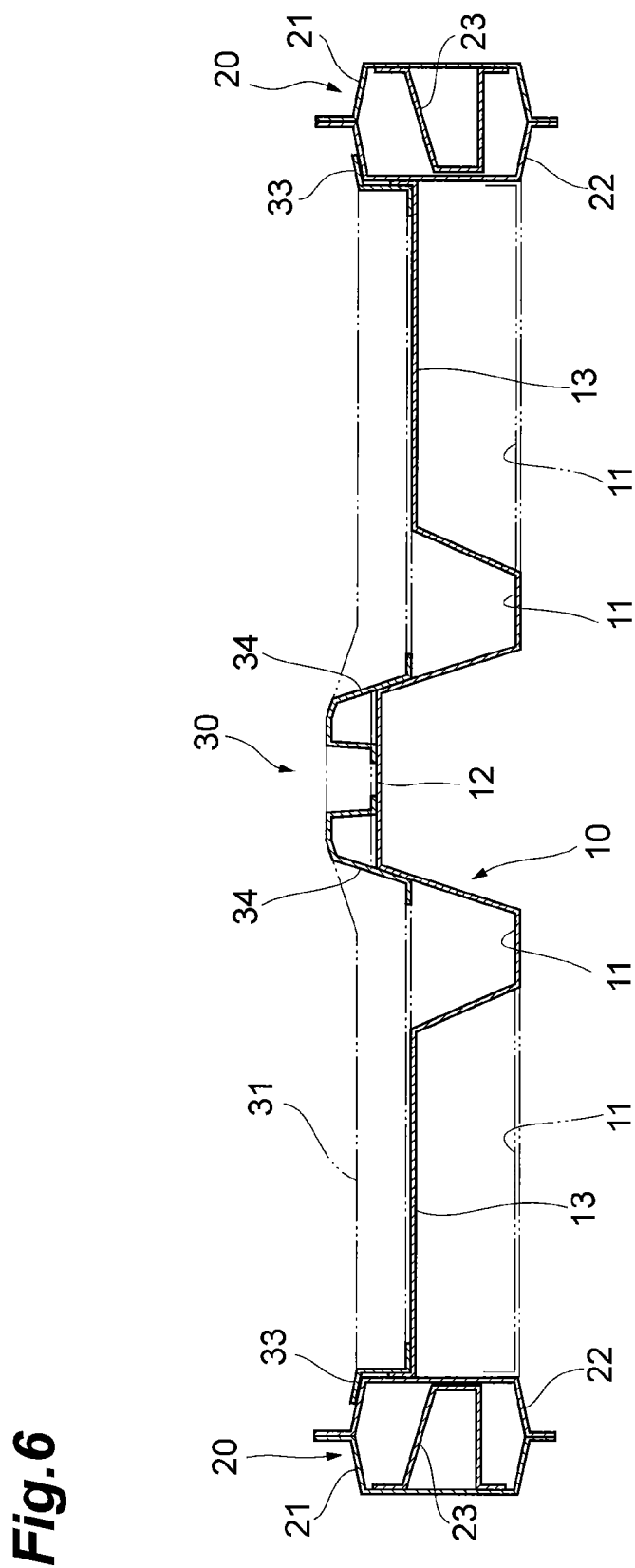
FIG. 6 is a cross-sectional view of the vehicle underbody structure taken along line VI-VI' in FIG. 1.

FIG. 6 is a cross-sectional view of the vehicle underbody structure taken along line VI-VI' in FIG. 1. As illustrated in FIG. 6, the cross member 30 is formed in such a manner that the rocker reinforcement portion 33 is joined with an upper surface and a side surface of the rocker 20. Accordingly, the rocker reinforcement portion 33 can reinforce an upper ridge of the rocker 20 inside the vehicle, and can improve strength against an input force from a side portion. The cross member 30 is formed in such a manner that lower surfaces of the first cross portion 31 and the second cross portion 32 are joined with the upper surface of the tunnel portion 12. The cross member 30 is formed in such a manner that sloping surfaces of connection portions between the tunnel reinforcement portion 34, and the first cross portion 31 and the second cross portion 32 are joined with an upper ridge of the tunnel portion 12, and thus a closed cross section is formed. Accordingly, the tunnel reinforcement portion 34 can reinforce the upper ridge of the tunnel portion 12, and can improve the strength of the tunnel portion 12.

Figure 7:
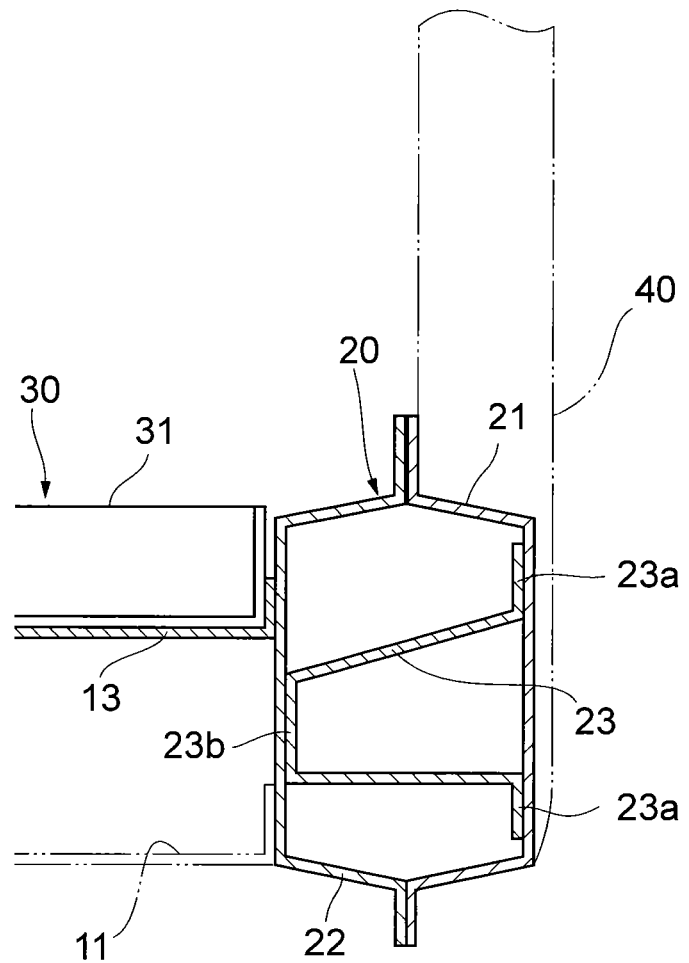
FIG. 7 is a cross-sectional view illustrating a detail of the rocker of the vehicle underbody structure according to the embodiment of the present invention.

FIG. 7 is a cross-sectional view illustrating a detail of the rocker 20 of the vehicle underbody structure according to the embodiment of the present invention. As illustrated in FIG. 7, the outer rocker 21 and the inner rocker 22 are respectively provided along outer and inner sides in the width direction of the vehicle body so as to extend in the longitudinal direction of the vehicle body. For example, each of the outer rocker 21 and the inner rocker 22 is a member with a substantially C-shaped cross section, and are joined with each other to form the cylindrical rocker 20 with a square cross section. The bulkhead 23 is provided along the inner lower portion of the rocker 20 so as to extend in the longitudinal direction of the vehicle body. For example, the bulkhead 23 is a reinforcement member with a substantially hat-shaped cross section. The bulkhead 23 has two leg portions 23a and a protrusion portion 23b which are respectively provided on the outside and the inside in the width direction of the vehicle body.

A lower portion of the center pillar 40 is joined with an upper surface and a side surface of the outer rocker 21, which are positioned at a center of the outer rocker 21 in the longitudinal direction of the vehicle body. The rocker reinforcement portion 33 is joined with the upper surface and an upper side portion of the inner rocker 22 (refer to FIG. 6). The bulkhead 23 is provided in such a manner that two leg portions 23a are joined with an inner surface of the outer rocker 21, and the protrusion portion 23b does not face a side portion of the cross member 30 via the inner rocker 22.

Subsequently, an operation of the vehicle underbody structure in a side collision will be described with reference to FIGS. 8 to 11.

Figure 8:
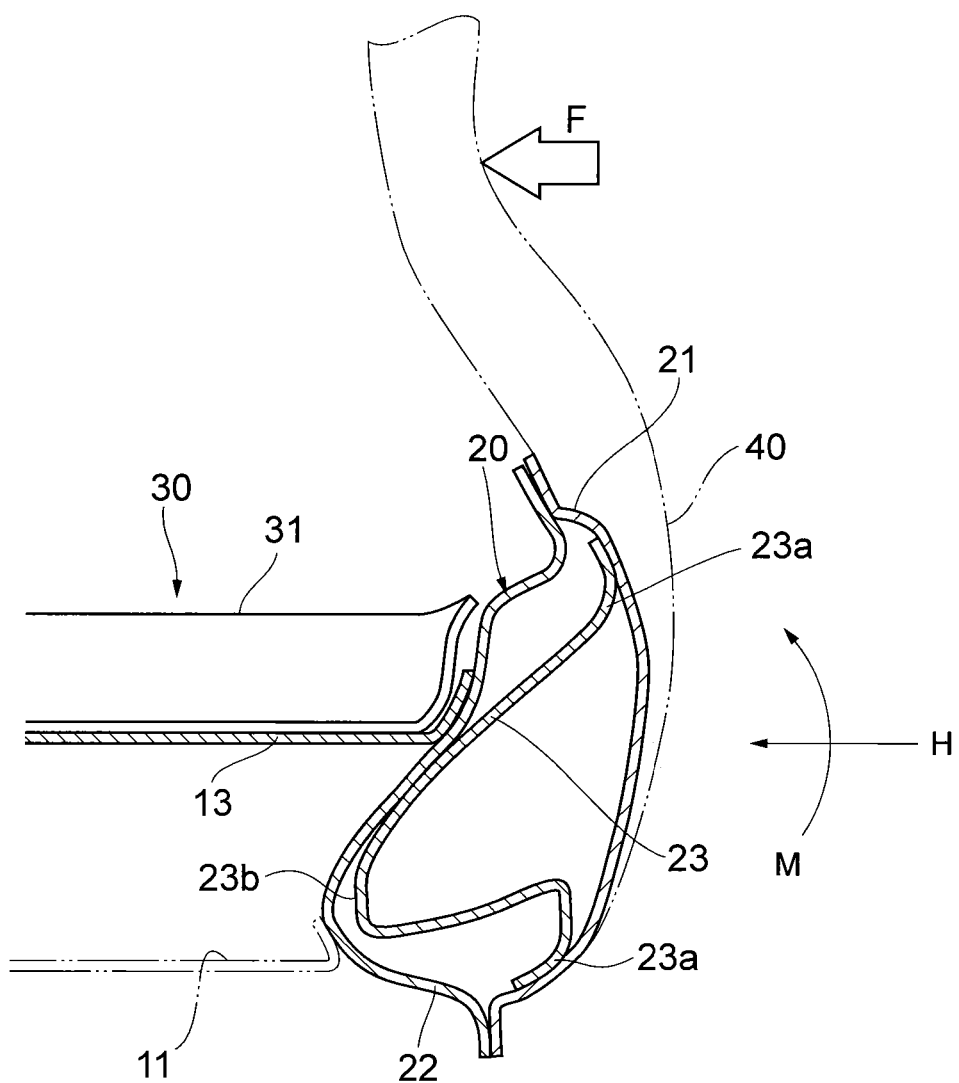
FIG. 8 is a cross-sectional view illustrating a deformation state of the rocker in a side collision, which is illustrated in FIG. 7.

FIG. 8 is a cross-sectional view illustrating a deformation state of the rocker 20 in a side collision, which is illustrated in FIG. 7. As illustrated in FIG. 8, when a collision load F is exerted on the center pillar 40 in the side collision, a lateral load H and a rotational moment M about a longitudinal axis are exerted on the rocker 20 that is joined with the lower portion of the center pillar 40. In this case, the lateral load H exerted on the rocker 20 is supported by axial forces of the first cross portion 31 (and the second cross portion 32) that are mounted in a bridging manner between the pair of rockers 20. Energy occurring in the side collision is absorbed by a deformation of the rocker reinforcement portion 33.

Here, the upper portion of the rocker 20 is more rigidly supported than the lower portion of the rocker 20 by the axial forces of the first cross portion 31 (and the second cross portion 32) which have strength greater than that of the rocker 20, and thus the lower portion of the rocker 20 is pushed toward a region under the cross member 30 and is deformed by the lateral load H. Therefore, a torsional deformation of the rocker 20 is suppressed in order for the upper portion thereof not to collapse inward in the width direction of the vehicle body. Here, since the protrusion portion 23b of the bulkhead 23 is disposed so as not to face the side portion of the cross member 30, the lateral load H is transmitted to a lower portion of the inner rocker 22, and the lower portion of the rocker 20 is more likely to be pushed toward the region under the cross member 30. Lower side end portions of the first cross portion 31 (and the second cross portion 32) interfere with the bulkhead 23 via the inner rocker 22, and a center of rotation of the rocker 20 is positioned above a lower end thereof. Accordingly, a moment exerted on the rocker 20 can be reduced, and thus a rotational deformation of the center pillar 40 can be suppressed.

Figure 9:
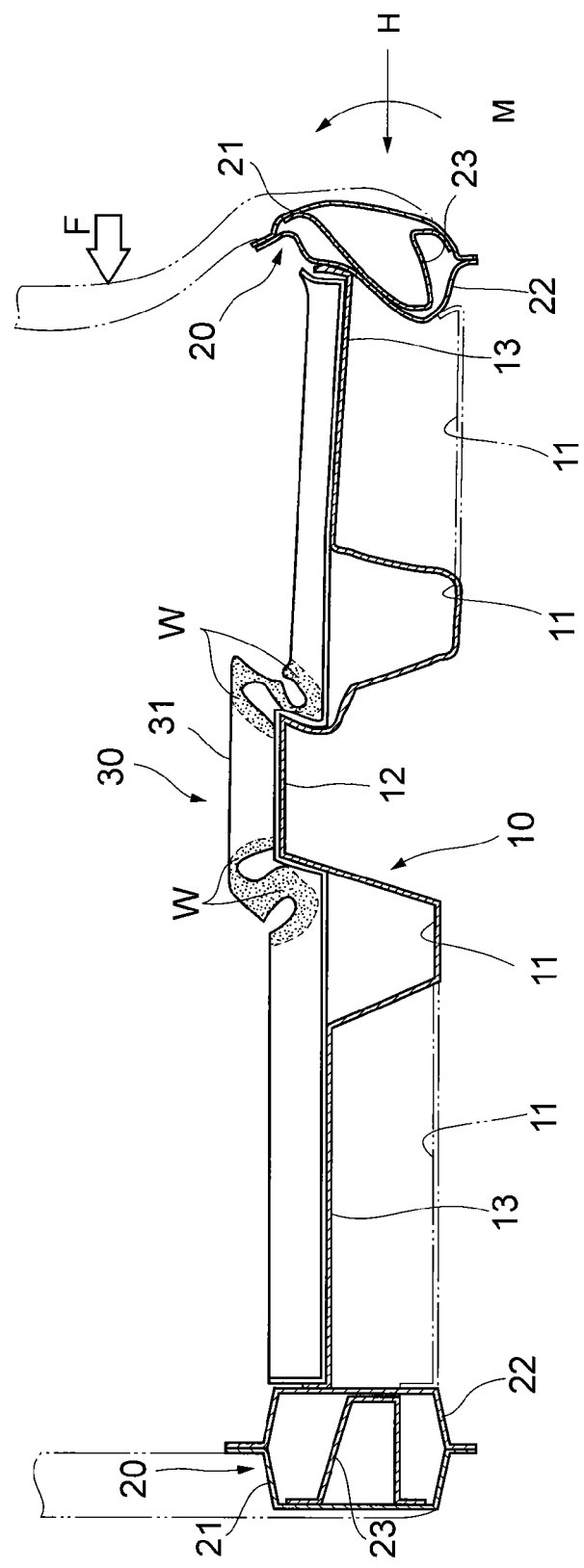
FIG. 9 is a cross-sectional view illustrating a deformation state of the vehicle underbody structure in a side collision, which is illustrated in FIG. 6.

FIG. 9 is a cross-sectional view illustrating a deformation state of the vehicle underbody structure in a side collision, which is illustrated in FIG. 6. As illustrated in FIG. 9, when the lateral load H is exerted on the first cross portion 31 (and the second cross portion 32) via the rocker 20, the fragile portions W are provided in the first cross portion 31 (and the second cross portion 32), and thus a substantially Z-shaped buckling deformation occurs in the fragile portions W. Therefore, the rocker 20 is displaced in such a manner that the upper portion of the rocker 20 moves substantially in parallel with the width direction of the vehicle body rather than collapsing inward in the width direction of the vehicle body.

Accordingly, since the torsional deformation of the rocker 20 is suppressed in order for the upper portion thereof not to collapse inward in the width direction of the vehicle body, the rotational deformation of the center pillar 40 is also suppressed so as not to collapse inward in the width direction of the vehicle body, and thus it is possible to improve a collision performance of the vehicle underbody structure in a side collision. Furthermore, since the strength of the cross member 30 is increased by the use of an ultra-high tensile strength steel sheet or the like, a combination of the cross member 30 and the bulkhead 23 can efficiently suppress the torsional deformation of the rocker 20.

Figure 10:
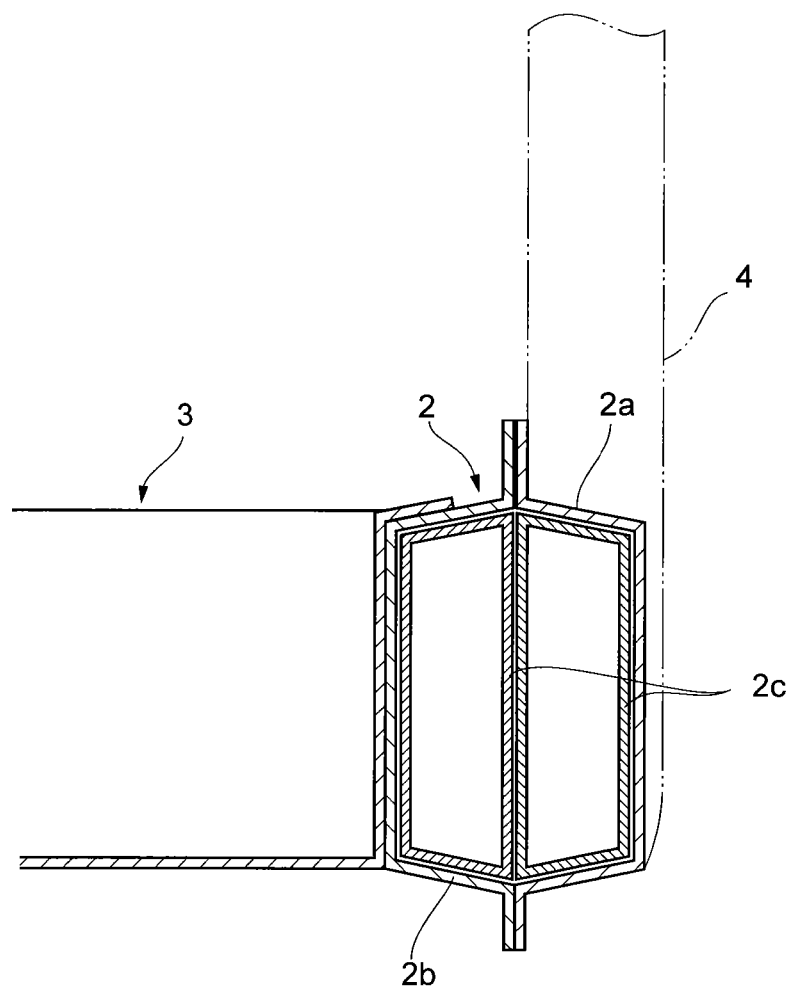
FIG. 10 is a cross-sectional view illustrating a detail of a rocker according to the related art.

In contrast, FIG. 10 is a cross-sectional view illustrating a detail of a rocker 2 according to the related art. As illustrated in FIG. 10, the rocker 2 in a vehicle underbody structure of the related art is configured to have an outer rocker 2a, an inner rocker 2b, and a pair of bulkheads 2c with a substantially rectangular cross section which are provided inside the rocker 2. Here, an upper surface and the entire side surface of the inner rocker 2b are joined with a side portion of a cross member 3. The bulkheads 2c are in contact with the entire inner surface of the rocker 2, and are provided in such a manner that the entire inside of the rocker 2 in the width direction of the vehicle body faces the side portion of the cross member 3.

Figure 11:
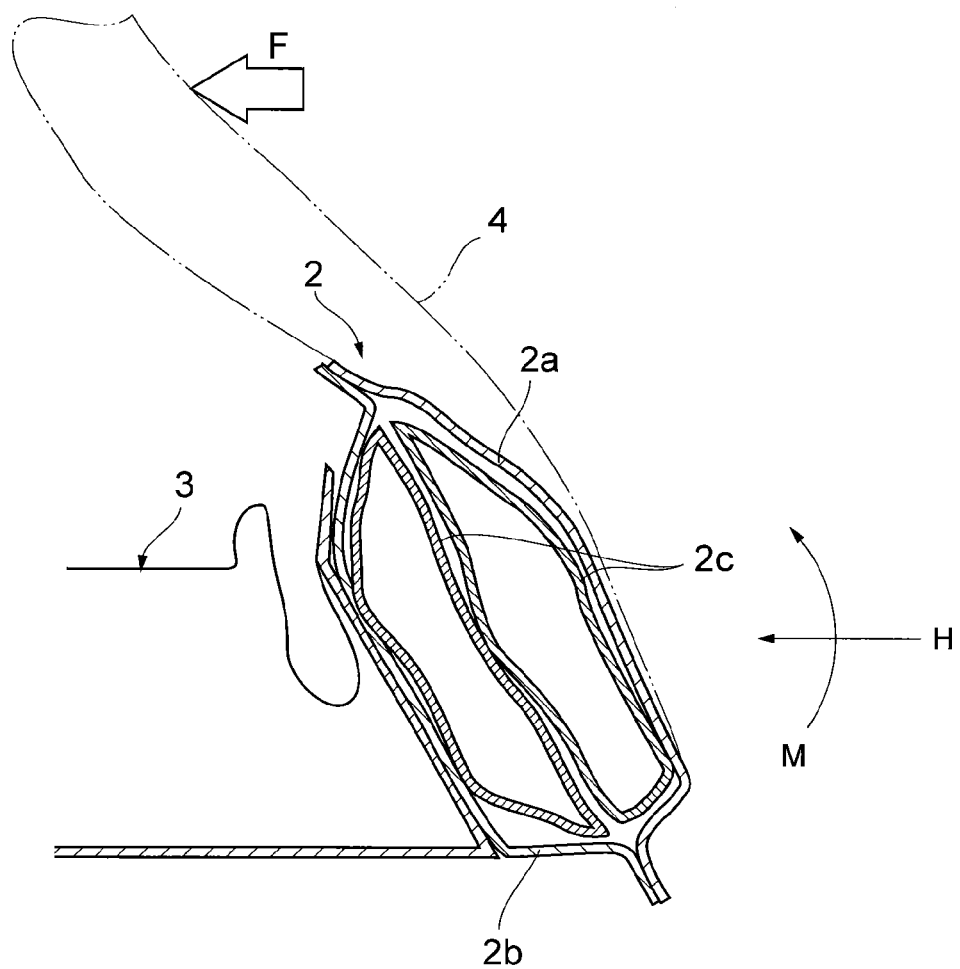
FIG. 11 is a cross-sectional view illustrating a deformation state of the rocker in a side collision, which is illustrated in FIG. 10.

FIG. 11 is a cross-sectional view illustrating a deformation state of the rocker 2 in a side collision, which is illustrated in FIG. 10. As illustrated in FIG. 11, when the collision load F is exerted on a center pillar 4 in the side collision, the moment M about the longitudinal axis is exerted on the rocker 2. However, since upper and lower portions of the rocker 2 are supported by an axial force of the cross member 3, the rocker 2 is deformed in such a manner that the lower portion thereof is not pushed toward a region under the cross member 3. Since the strength of the cross member 3 is not high, the cross member 3 cannot also rigidly support the rocker 2. Therefore, it is not possible to suppress a torsional deformation, by which the upper portion of the rocker 2 collapses inward in the width direction of the vehicle body. Since a center of rotation of the rocker 2 is positioned at a lower end thereof, a moment exerted on the rocker 2 cannot be reduced. For this reason, a rotational deformation, by which the center pillar 4 collapses inward in the width direction of the vehicle body, increases, and thus it is not possible to satisfactorily ensure the collision performance of the vehicle underbody structure in a side collision.

Figure 12:
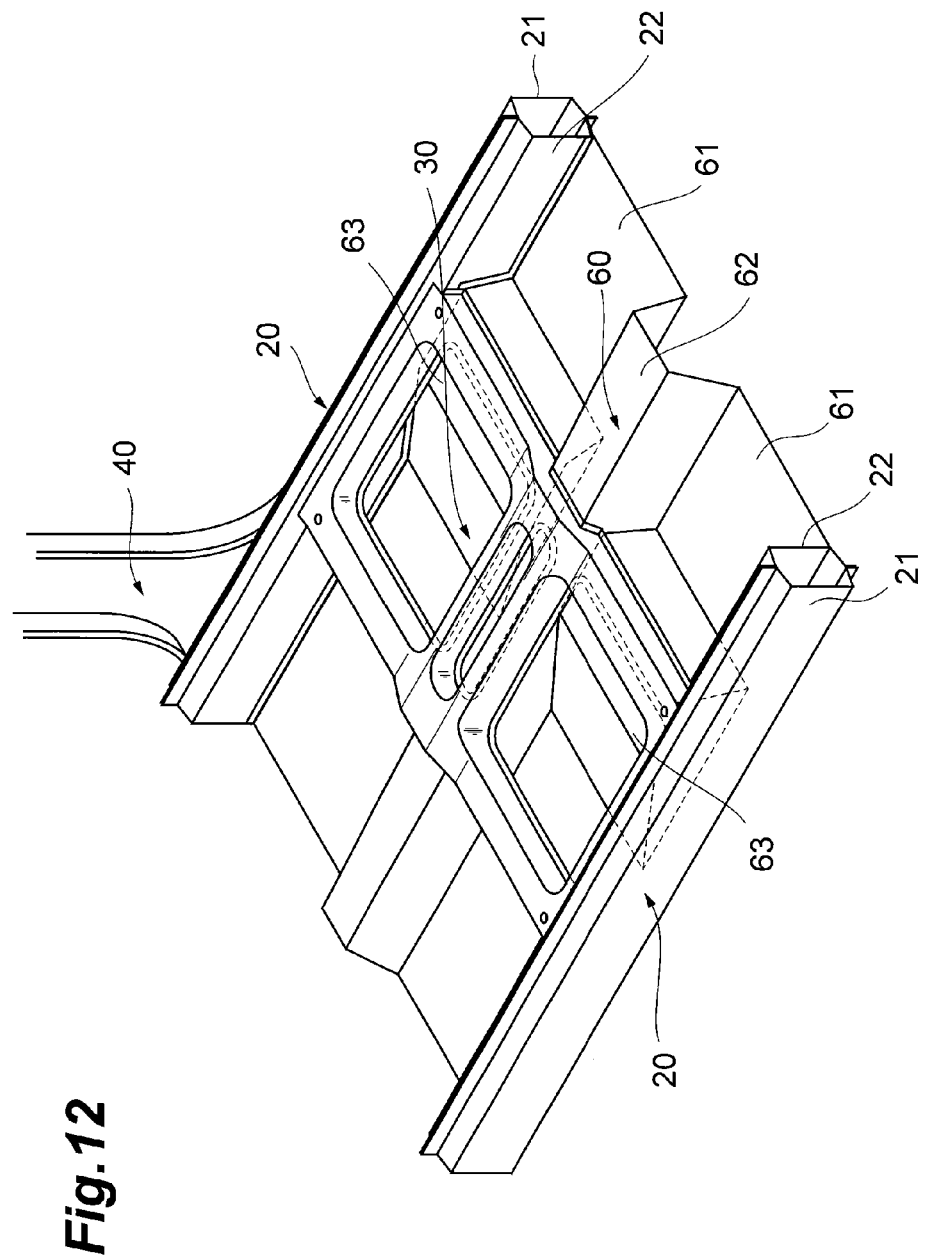
FIG. 12 is a perspective view illustrating First Modification Example of the floor panel.
Figure 13:
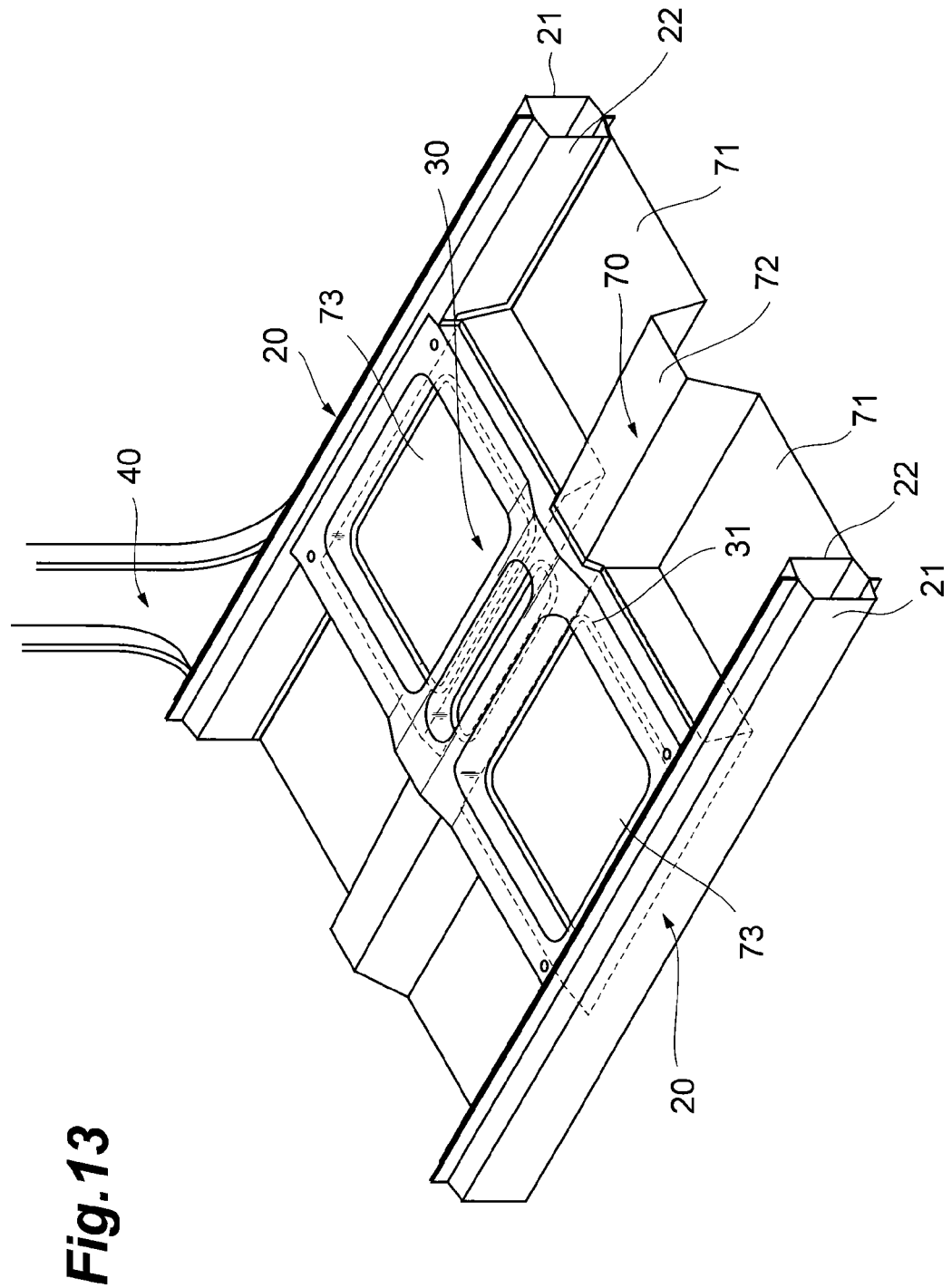
FIG. 13 is a perspective view illustrating Second Modification Example of the floor panel.

Subsequently, modification examples of the floor panel 10 will be described with reference to FIGS. 12 and 13. FIGS. 12 and 13 are perspective views illustrating respective floor panels 60 and 70 in First and Second Modification Examples of the floor panel 10.

As illustrated in FIG. 12, a floor bulging portion 63 may be provided so as to be in contact with the rocker 20 and a tunnel portion 62. Accordingly, since the collision load F is likely to be transmitted from the floor bulging portion 63 to the tunnel portion 62, it is possible to improve the rigidity of the vehicle underbody structure.

As illustrated in FIG. 13, a floor bulging portion 73 may be provided on the rear side so as to extend in the longitudinal direction of the vehicle body in such a manner that an upper surface of the floor bulging portion 73 is in contact with the respective lower surfaces of the first cross portion 31 and the second cross portion 32. Therefore, a cross section which is closed in the longitudinal direction of the vehicle body is formed by the first cross portion 31 and the second cross portion 32, and the floor bulging portion 73. Accordingly, since the collision load F is likely to be transmitted from the cross member 30 to the floor panel 70, it is possible to improve the rigidity of the vehicle underbody structure.

As described above, in the vehicle underbody structure according to the embodiment of the present invention, the pair of rockers 20 are provided along both side portions of each of the floor panels 10, 60, and 70 in the vehicle body so as to extend in the longitudinal direction of the vehicle body, and the cross member 30 is mounted in a bridging manner between the pair of rockers 20 so as to be apart from the respective floor surfaces 11, 61, and 71 of the floor panels 10, 60, and 70, and the cross member 30 has strength greater than that of the rocker 20. Accordingly, when a side collision occurs, the upper portion of the rocker 20 is more rigidly supported than the lower portion of the rocker 20 by the axial force of the cross member 30 that has strength greater than that of the rocker 20, and thus the lower portion of the rocker 20 is likely to be pushed toward the region under the cross member 30. Therefore, the torsional deformation of the rocker 20 is suppressed in order for the upper portion thereof not to collapse inward in the width direction of the vehicle body, the rotational deformation of the center pillar 40 is also suppressed, and thus it is possible to improve the collision performance of the vehicle underbody structure in the side collision.

Since the protrusion portion 23b is provided in the inner lower portion of the rocker 20 so as to protrude inward in the width direction of the vehicle body, when a side collision occurs, the protrusion portion 23b hits against the cross member 30, and thus the lower portion of the rocker 20 is more likely to be pushed toward the region under the cross member 30.

Since the pair of rocker reinforcement portions 33 connect the first cross portion 31 and the second cross portion 32, energy occurring in the side collision can be absorbed by a deformation of the rocker reinforcement portion 33. It is possible to reduce the number of reinforcement components that reinforce the vicinity of the lower portion of the center pillar 40.

Since each of the floor bulging portions 13, 63, and 73 is provided so as to be in contact with the lower surface of the first cross portion 31, a load is transmitted from the first cross portion 31 to each of the floor bulging portions 13, 63, and 73. Accordingly, it is possible to improve the rigidity of the vehicle underbody structure.

Since the fragile portion W is provided in such a manner that the fragile portion W is bent so as to cover each of the tunnel portions 12, 62, and 72, when a side collision occurs, the fragile portion W deforms in such a manner that the cross section of the deformed fragile portion W becomes a substantially Z shape, the rocker 20 is likely to deform in such a manner that the rocker 20 moves substantially in parallel with the width direction of the vehicle body, and thus the torsional deformation of the rocker 20 can be suppressed.

Since the cross-sectional height of the cross member 30 is suppressed so as not to be large, the cross-sectional height of the cross member 30 is suppressed so as not to be large, and it is possible to adopt the cross member 30 with a structure suitable for application of an ultra-high tensile strength steel sheet.

The best embodiment of the vehicle underbody structure according to the present invention is described above. The vehicle underbody structure according to the present invention is not limited to the aforementioned embodiment. Modifications may be made to the vehicle underbody structure according to the present invention or the present invention may be applied to structures other than the vehicle underbody structure according to the embodiments insofar as the modifications and the other structures do not depart from the scope of the present invention, which are described in each claim.

REFERENCE SIGNS LIST 10, 60, and 70: floor panel, 11, 61, and 71: floor surface, 12, 62, and 72: tunnel portion, 13, 63, and 73: floor bulging portion, 20: rocker, 23b: protrusion portion, 30: cross member, 31: first cross portion, 32: second cross portion, 33: rocker reinforcement portion, 40: center pillar, W: fragile portion.

The invention claimed is:
1. A vehicle underbody structure comprising:
    a floor panel that is provided so as to extend in a longitudinal direction of a vehicle body;

a pair of rockers that are respectively provided along both side portions of the floor panel in the vehicle body so as to extend in the longitudinal direction of the vehicle body; and a cross member that is formed so as to have a cross-sectional height smaller than that of the rocker, and that is mounted in a bridging manner between the pair of rockers in such a manner that lateral portions of the cross member are supported on an upper portion of the rockers such that the cross member is spaced apart from a floor surface of the floor panel, wherein the cross member has a first cross portion that is provided on a front side of the vehicle body so as to extend in the width direction of the vehicle body; a second cross portion that is provided on a rear side of the vehicle body so as to extend in the width direction of the vehicle body; and a pair of connection members that connect the first and second cross portions along the pair of rockers, respectively.

2. The vehicle underbody structure according to claim 1, wherein an inner lower portion of the rocker is provided with a protrusion portion which protrudes inward in a width direction of the vehicle body.

3. The vehicle underbody structure according to claim 1, wherein the floor panel is provided with a bulging portion that bulges upward from the floor surface so as to be in contact with a lower surface of the first cross portion.

4. The vehicle underbody structure according to claim 1, wherein a tunnel portion is provided at a center portion of the floor panel, and wherein the cross member is provided with a fragile portion that is bent so as to cover the tunnel portion.

5. The vehicle underbody structure according to claim 1, wherein the cross member that has strength greater than that of the rocker.

6. The vehicle underbody structure according to claim 2, wherein the rocker has a bulkhead that is provided between an outer rocker and an inner rocker, wherein the protrusion portion is formed on the bulkhead and joined with the inner rocker, and wherein a position where the cross member and the inner rocker are joined is higher than a position where the inner rocker and the protrusion portion are joined.

* * * * *